United States Patent [19]

Blomstrom et al.

[11] 3,926,273
[45] Dec. 16, 1975

[54] TRACK MOUNTING ARRANGEMENT HAVING DUAL GAUGE SETTINGS

[75] Inventors: Gary D. Blomstrom, Waverly, Nebr.; Victor Randour, Aurora; Lyle E. York, Peoria, both of Ill.

[73] Assignee: Caterpillar Tractor Co., Peoria, Ill.

[22] Filed: Sept. 9, 1974

[21] Appl. No.: 504,054

[52] U.S. Cl. ............................... 180/9.48; 305/17
[51] Int. Cl.² ....................................... B62D 55/00
[58] Field of Search ................. 305/6, 16, 17, 18, ; 180/5 R, 6.64, 9.48, 9.6

[56] References Cited
UNITED STATES PATENTS

| | | | |
|---|---|---|---|
| 1,348,558 | 8/1920 | Garner | 180/9.6 |
| 1,534,297 | 4/1925 | Carey | 180/9.6 |
| 1,665,470 | 4/1928 | Norelius | 180/9.6 |

Primary Examiner—Philip Goodman
Assistant Examiner—John A. Carroll
Attorney, Agent, or Firm—Phillips, Moore, Weissenberger Lempio & Strabala

[57] ABSTRACT

A crawler tractor includes a main frame, and longitudinally-extending track frames on either side thereof. A generally T-shaped member interconnects the rearward end of each track frame with the main frame, with the oppositely-extending arms of each generally T-shaped member being unequal in length. Each generally T-shaped member may be pivoted to substantially 180° about the remaining arm thereof to vary the lateral position of the associated rearward end of the track frame. An equalizer bar interconnects the main frame and the track frames forwardly of the rearward portions thereof, and means are associated with the equalizer bar and the track frames for varying the lateral positions of the forward portions of the track frames in accordance with the variation of the lateral positions of the rearward portions as set forth above.

12 Claims, 4 Drawing Figures

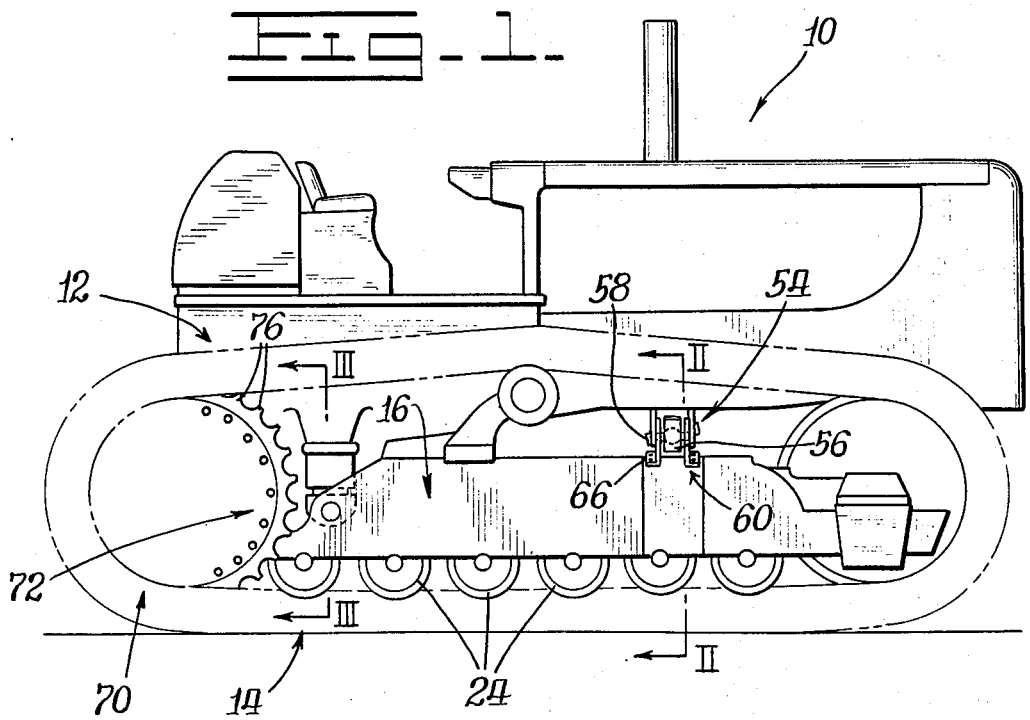
Fig_1_
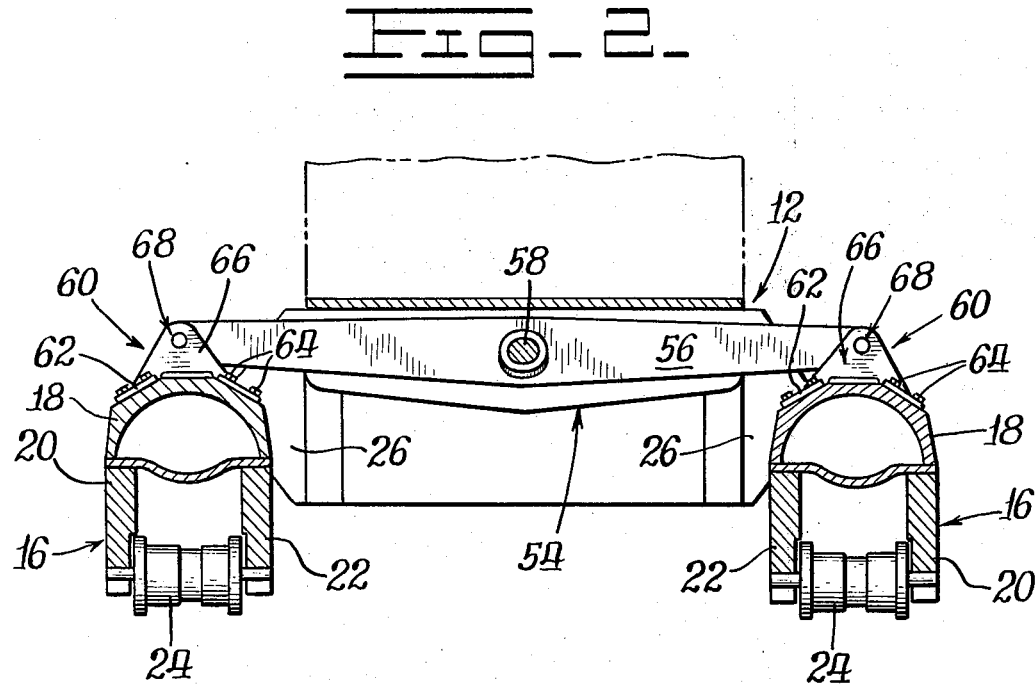
Fig_2_

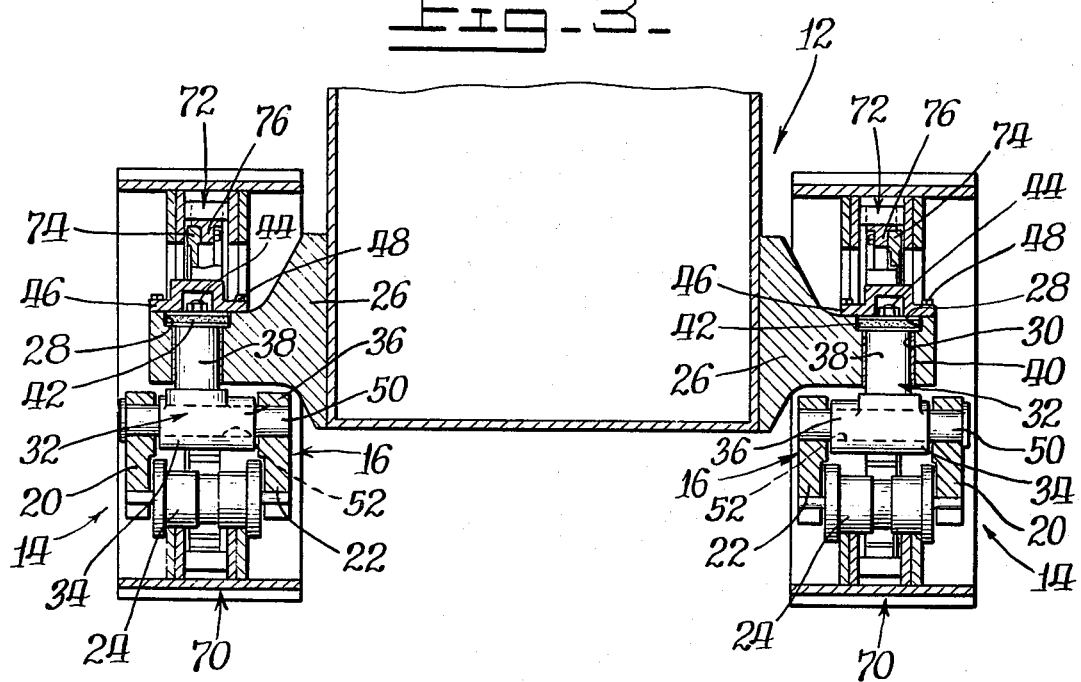
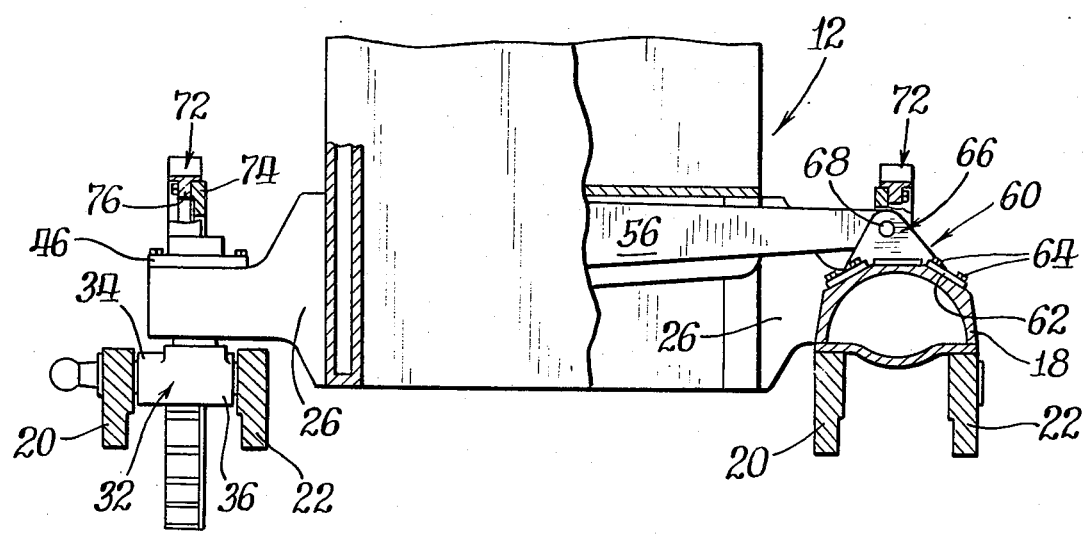

TRACK MOUNTING ARRANGEMENT HAVING DUAL GAUGE SETTINGS

BACKGROUND OF THE INVENTION

This invention relates to crawler tractors, and more particularly, to a track mounting arrangement thereof, wherein reversible components are included to provide various gauge settings of the track assemblies.

A particular track-type tractor is normally manufactured with a fixed track gauge or width between the sprocket center lines. Such width is generally chosen as a compromise to provide acceptable overall performance over a relatively wide range of soil or ground conditions. Such choosing of a fixed width reduces the manufacturing cost and thus the price of the machine. However, if a vehicle is to be utilized most efficiently under a wide variety of soil conditions, it may be quite advantageous to provide means which allow variation of the gauge. For example, if a vehicle is to be operated mainly in soft or marshy soil conditions, its performance can be greatly improved by converting the vehicle to a wider gauge so that extra wide track shoes can be installed and utilized.

In the prior art, it is well-known to utilize installable and removable spacer means for varying the gauge of a vehicle. (See U.S. Pat. No. 1,822,093 to Hendrickson et al, U.S. Pat. No. 2,712,873 to Peterson, and German Specification No. 1,815,318.) While such a system is effective in varying the gauge of the vehicle, it is to be understood that the installation or remvoal of such spacers is a relatively complex and difficult operation.

U.S. Pat. No. 3,700,115 to Johnson et al utilizes links interconnecting a main frame and the track frames of a vehicle, the links being pivotable to vary the gauge of the vehicle. Again, while such structure is relatively effective in operation, it will be understood that the design and construction of such linkages is relatively complicated, and a relatively high degree of maintenance must be provided for ensuring that such linkages and pivots associated therewith are in proper operating order.

SUMMARY OF THE INVENTION

It is accordingly an object of this invention to provide a track-type vehicle wherein the gauge or width defined by the tracks may be relatively easily and conveniently varied.

It is a further object of this invention to provide a track-type vehicle which, while fulfilling the above object, is extremely effective and stable in use, meanwhile being simple and efficient in design.

Broadly stated, the invention comprises a crawler tractor comprising main frame means, at least one longitudinally-extending track frame on one side of the main frame means, and connecting means between the rearward end of the track frame and the main frame means. The connecting means comprise a member defining a first arm associated with the track frame, and a remaining arm associated with the main frame means. The end of the first arm defines the position of the rear end of the track frame laterally of the main frame means, the member being movable to a position to determine a position of the rearward end of the track frame generally laterally of the first-defined position.

BRIEF DESCRIPTION OF THE DRAWINGS

These and other objects of the invention will become apparent from a study of the following specification and drawings, in which:

FIG. 1 is a side elevation of a crawler tractor incorporating the invention;

FIG. 2 is a sectional view taken along the line II—II of FIG. 1;

FIG. 3 is a sectional view taken along the line III—III of FIG. 1, showing the crawler tractor in a narrow-gauge state; and FIG. 4 is a view similar to that shown in FIG. 3, partially in section, but showing the tractor in a wide-gauge state.

DESCRIPTION OF THE PREFERRED EMBODIMENT

Referring to the drawings, a crawler tractor is generally indicated at 10 in FIG. 1. The crawler tractor 10 includes main frame means 12, and laterally-spaced endless track assemblies 14 on opposite sides of the main frame means 12. Each track assembly 14 includes a track roller frame 16 extending longitudinally on a side of the main frame means 12. Each track roller frame 16 includes an elongated upper portion 18, and a pair of spaced lower side walls 20, 22 secured thereto. The rollers 24 of each track frame 16 are supported by and between such side walls 20, 22.

The main frame means 12 include a pair of brackets 26 extending laterally outwardly adjacent the rearward end thereof. Each bracket 26 defines a pair of vertically-disposed coaxial bores 28, 30 formed therein. A generally T-shaped member 32 is associated with each such bore 30. Such generally T-shaped member 32 defines first and second oppositely-extending arms 34, 36 of unequal length, and a remaining arm 38 of cylindrical configuration which is associated with the main frame means 12 by being positioned in the bore 30. Such cylindrical arm 38 is rotatably disposed within a sleeve bearing 40 which is pressfitted into the bore 30. A metal-backed resilient pad 42 is disposed within the bore 28 and is secured to the axial end of the arm 38 by means of a bolt 44. The resilient pad 42 is retained in the bore 28 by means of a cap 46 secured to the bracket 26, through the use of a plurality of capscrews 48. It will thus be seen that the remaining arm 38 of the generally T-shaped member 32 is pivotable about the longitudinal axis of that remaining arm 38, and is positioned generally vertically.

A shaft 50 extends between the pair of side walls 20, 22 being positioned substantially perpendicular to the longitudinal axis of the track frame 16 adjacent the rearward end thereof. The unequal length arms 34, 36 together define a continuous bore 52 within which the shaft 50 is positioned. The unequal length arms 34, 36 are positioned between the side walls 20, 22 with the ends thereof extending to adjacent the respective side walls 20, 22.

The opposite generally T-shaped member 32 interconnects the rearward portion of the other track frame and the opposite bracket 26 in the same manner.

It will thus be seen that the generally T-shaped members 32 act as connecting means between the rearward ends of the track frames 16 and the main frame means 12.

The main frame means 12 includes a transversely-extending saddle member 54 of inverted U-shaped cross-section. A transversely-oriented equalizer bar 56 is disposed within the U-shaped saddle member 54 and is pivotally connected thereto by a centrally-disposed pin 58. Such bar 56 is positioned forwardly of the rearward ends of the track frames 16. Means shown at 60 pivotally connect each extending end of the bar 56 relative to a respective track frame 16, forwardly of the rearward end of the track frame 16. Each means 60 includes a mounting bracket 62 removably secured to a respective track roller frame 16 by a plurality of bolts 64. Each mounting bracket 62 includes flange means 66 which receive a spherical pivot pin arrangement 68 for pivotally securing a respective end of the equalizer bar 56 to the bracket 62. The arm-track frame pivot defined by the flange means 66 is offset from the longitudinal center of the track assembly 14.

Each track assembly 14 includes an endless track chain assembly 70 driven by a sprocket arrangement 72 in the usual manner. The sprocket arrangement 72 includes a flange 74 and a plurality of bolt-on sprocket segments 76. The width of the flange 74 is sized in a particular manner which will be discussed in detail. The sprocket segments 76 may be secured to either the inner or outer face of the flange 74.

In operation, the brackets 26 and generally T-shaped members 32 are oriented as shown in FIGS. 2 and 3, initially, to provide a narrow gauge track arrangement. The positions of the rearward portions of the track frames 16 are determined and defined by the ends of the unequal length arms 34, 36 of the generally T-shaped members 32, which are adjacent the side walls 20, 22. The positioning of each pivot pin arrangement 68 laterally of the main frame means 12 is defined by the secured position of each bracket 62 relative to its associated track frame 16. The dimensions of the offset involved in each bracket 62, and the length of the unequal-length arms 34, 36, are chosen so as to provide substantially straight positioning of the track frames 16.

In order to increase the track gauge of the vehicle 10 (i.e., the distance between the track frames 16), the generally T-shaped members 32 are rotated or pivoted about the longitudinal axis of the remaining arm 38 of each one, to the position shown in FIG. 4. The ends of the unequal length arms 34, 36, which define the positions of the rearward ends of the track frames 16, will move such ends laterally outwardly of the main frame means 12. In such state, the positions of the unequal length arms 34, 36 are substantially positionally reversed.

Also, each bracket 62 including the flange means 66 thereof is positionally reversed and moved to a second position to define a bar-track frame pivot position laterally outwardly of the first-mentioned position thereof, described above. The lateral change in each bar-track frame pivot position is chosen, by dimensioning of the flange means 66 of the bracket 62, so that reversal of such bracket 62, along with substantially 180° rotation of each generally T-shaped member 32, results in each track frame 16 being disposed in a generally straight manner along the side of the main frame means 12.

The sprocket segments 76 are repositioned to the outside surface of the flange 74 so that they mesh properly with the track links of the chain assembly 70. The width of each flange 74 is chosen so that such operation of reversing the elements described above, to achieve such wide track gauge of the vehicle 10, may properly take place.

The shaft 50 may define a spherical section 78 formed thereon for mounting a bulldozer to the roller frames 16, as shown in FIG. 4.

As set forth above, the increasing of the track gauge by moving the track frames 16 laterally of the main frame means 12 provides greater clearance between the track frames 16 and the main frame means 12, thereby permitting wider track shoes to be employed, if so desired.

What is claimed is:

1. A crawler tractor comprising:
   main frame means;
   at least one longitudinally-extending track frame on one side of the main frame;
   connecting means between the rearward end of said track frame and the main frame means, said connecting means comprising a member defining a first arm associated with said track frame, said member further comprising a remaining arm associated with the main frame means, the member being movable to a first position wherein the first arm defines a first position of the rearward end of the track frame laterally of the main frame means, the member being movable to a second position to determine a second position of the rearward end of the track frame generally laterally of the first-defined position of the rearward end of the track frame.

2. The apparatus of claim 1 wherein said member further defines a second arm so that the member is generally T-shaped, the first and second arms being oppositely extended and of unequal length, the ends of the unequal length arms defining the position of the rearward end of the track frame laterally of the main frame means.

3. The apparatus of claim 2 wherein the remaining arm defines a longitudinal axis, and wherein the generally T-shaped member is pivotal to move about the longitudinal axis of the remaining arm, to a position wherein the unequal length arms are substantially positionally reversed.

4. The apparatus of claim 3 wherein the remaining arm is positioned generally vertically.

5. The apparatus of claim 4 wherein the track frame comprises a pair of side walls, and a shaft extending therebetween substantially perpendicular to the longitudinal axis of the track frame, and wherein the unequal length arms together define a continuous bore within which the shaft is positionable.

6. The apparatus of claim 5 wherein the unequal length arms are positioned between the side walls with the ends thereof extending to adjacent the respective side walls.

7. The apparatus of claim 1 and further comprising a bar pivotally fixed relative to the main frame means and having an extended end, and means pivotally connecting the extending end of the bar relative to the track frame, forwardly of the rearward end of the track frame.

8. The apparatus of claim 7 wherein the means pivotally connecting the extending end of the bar relative to the track frame comprise flange means defining an arm-track frame pivot, said flange means being securable relative to the track frame in a first position to define a bar-track frame pivot position, and in a second position to define said bartrack frame pivot position lateral of the first-mentioned position thereof.

9. The apparatus of claim 8 wherein the flange means are reversed in position between said first and second positions thereof.

10. The apparatus of claim 6 and further comprising a bar pivotally fixed relative to the main frame means and having an extended end, and means pivotally connecting the extending end of the bar relative to the track frame, forwardly of the rearward end of the track frame.

11. The apparatus of claim 10 wherein the means pivotally conecting the extending end of the bar relative to the track frame comprise flange means defining an arm-track frame pivot, said flange means being securable relative to the track frame in a first position to define a bar-track frame pivot position, and in a second position to define said bar-track frame pivot position laterally of the first-mentioned position thereof.

12. The apparatus of claim 11 wherein the flange means are reversed in position between said first and second positions thereof.

* * * * *